(12) United States Patent
Montaldi et al.

(10) Patent No.: US 11,899,904 B2
(45) Date of Patent: Feb. 13, 2024

(54) TEXT INPUT SYSTEM WITH CORRECTION FACILITY

(71) Applicant: Microsoft Technology Licensing, LLC, Redmond, WA (US)

(72) Inventors: Marisa Clare Montaldi, London (GB); Richard David Tunnicliffe, London (GB); Alice Elizabeth Rosam, London (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 15/486,244

(22) Filed: Apr. 12, 2017

(65) Prior Publication Data

US 2018/0300021 A1  Oct. 18, 2018

(51) Int. Cl.
*G06F 3/023* (2006.01)
*G06F 3/0482* (2013.01)
*G06F 3/04886* (2022.01)

(52) U.S. Cl.
CPC .......... *G06F 3/0482* (2013.01); *G06F 3/0236* (2013.01); *G06F 3/0237* (2013.01); *G06F 3/04886* (2013.01)

(58) Field of Classification Search
CPC .... G06F 3/0482; G06F 3/0237; G06F 3/0236; G06F 3/04886
See application file for complete search history.

(56) References Cited

U.S. PATENT DOCUMENTS

| | | | | |
|---|---|---|---|---|
| 5,111,398 A | * | 5/1992 | Nunberg | G06F 40/253 704/9 |
| 5,754,737 A | * | 5/1998 | Gipson | G06F 40/232 706/11 |
| 8,374,846 B2 | | 2/2013 | Assadollahi | |
| 8,712,931 B1 | * | 4/2014 | Wahlen | G06F 3/0237 706/12 |
| 9,122,376 B1 | * | 9/2015 | Brotherston | G06F 17/30637 |
| 9,128,921 B2 | | 9/2015 | Griffin et al. | |
| 9,244,536 B2 | | 1/2016 | Kocienda et al. | |
| 9,424,246 B2 | | 8/2016 | Spencer et al. | |
| 2004/0234315 A1 | * | 11/2004 | Colwell | G06F 3/0489 400/489 |

(Continued)

OTHER PUBLICATIONS

Ahmed, "How can we improve SwiftKey?", http://swiftkey.uservoice.com/forums/116689-ideas-and-suggestions/suggestions/2722405-change-rules-regarding-spaces-corrections-when-pun?page=2&per_page=20, Published on: Mar. 28, 2012, 2 pages.

(Continued)

*Primary Examiner* — Jennifer N Welch
*Assistant Examiner* — Kuang F Chen
(74) *Attorney, Agent, or Firm* — Barta Jones, PLLC

(57) ABSTRACT

A text input system is described for inputting text to a computing device. The text input system has a memory storing a composing region comprising a plurality of text items selected by a user for potential input into the computing device. The text input system has a composing region updater which detects one of the plurality of text items as being a designated symbol. The composing region updater is configured to detect a corrective action acting to correct associated text associated with the selected text items and, when the corrective action is detected, to return the plurality of text items including the designated symbol to the composing region.

20 Claims, 9 Drawing Sheets

(56) References Cited

U.S. PATENT DOCUMENTS

| | | | |
|---|---|---|---|
| 2011/0201387 A1 | 8/2011 | Paek et al. | |
| 2015/0120281 A1* | 4/2015 | VanBlon | G06F 40/166 704/9 |
| 2015/0149880 A1* | 5/2015 | Azose | G06F 17/273 715/229 |
| 2015/0317069 A1* | 11/2015 | Clements | G06F 3/0237 715/773 |
| 2016/0282956 A1* | 9/2016 | Ouyang | G06F 3/0237 |
| 2017/0308290 A1* | 10/2017 | Patel | G06F 3/04886 |
| 2019/0018841 A1* | 1/2019 | Zhang | G06F 40/253 |

OTHER PUBLICATIONS

Fehily, Chris, "Working with Text on the Google Nexus 7 Tablet", http://www.peachpit.com/articles/article.aspx?p=1982518&seqNum=3, Dec. 24, 2012, 2 pages.

Whitwam, Ryan, "Fleksy Keyboard Has Some Interesting Tricks, But Definitely Still Beta", http://www.androidpolice.com/2013/05/31/hands-on-fleksy-keyboard-has-some-interesting-tricks-but-definitely-still-beta/, Published on: May 31, 2013, 3 pages.

* cited by examiner

TEXT INPUT SYSTEM WITH CORRECTION FACILITY

BACKGROUND

Text input system such as predictive virtual keyboards, predictive speech input systems and others are increasingly used to enter information into electronic devices and computing systems. Where electronic devices have a small form factor it can be burdensome for users to manually type in text using virtual keyboards. Where speech input is difficult due to background environment noise and/or the need to avoid disturbing others it is difficult to speak individual data items for input.

Text input systems which use predictive technology to predict candidate next text input items are increasingly available. These include predictive virtual keyboards and other text input systems which offer candidate next text items, such as words, phrases, sentences, emoji, images, stickers, emoticons and others for the user to select. The user can then give a single input action such as a speech input, touch input or other modality of input to input the candidate text item.

Text input systems using predictive technology typically autocomplete or autocorrect text items using the predicted candidates. This leads to problems where the end result is not what the user intended. In that case the user has increased work and burden to correct the autocompleted or autocorrected text items and then to manually correctly enter the intended text item.

The embodiments described below are not limited to implementations which solve any or all of the disadvantages of known text input systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A text input system is described for inputting text to a computing device. The text input system has a memory storing a composing region comprising a plurality of text items selected by a user for potential input into the computing device. The text input system has a composing region updater which detects one of the plurality of text items as being a designated symbol. The composing region updater is configured to detect a corrective action acting to correct associated text associated with the selected text items and, when the corrective action is detected, to return the plurality of text items including the designated symbol to the composing region.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a virtual keyboard text entry system, the system described is provided as an example and not a limitation. As those skilled in the art will appreciate, the present examples are suitable for application in a variety of different types of text input systems including but not limited to: browsers, e-readers, document authoring applications, predictive keyboards and others. Data may be input using any modality including speech, touch, gesture, pointing and others.

The present technology comprises a text input system 108 where the user is able to more efficiently correct text which has been input to a computing device as a result of auto-correction or autocompletion of text by a text predictor. Text is said to be correct when it is as the user intends. This reduces burden of manually inputting text to the computing device. The resources of the computing device are also conserved since text input uses resources of a computing device including power and memory resources in order to detect, interpret and store user input.

Figure 1:
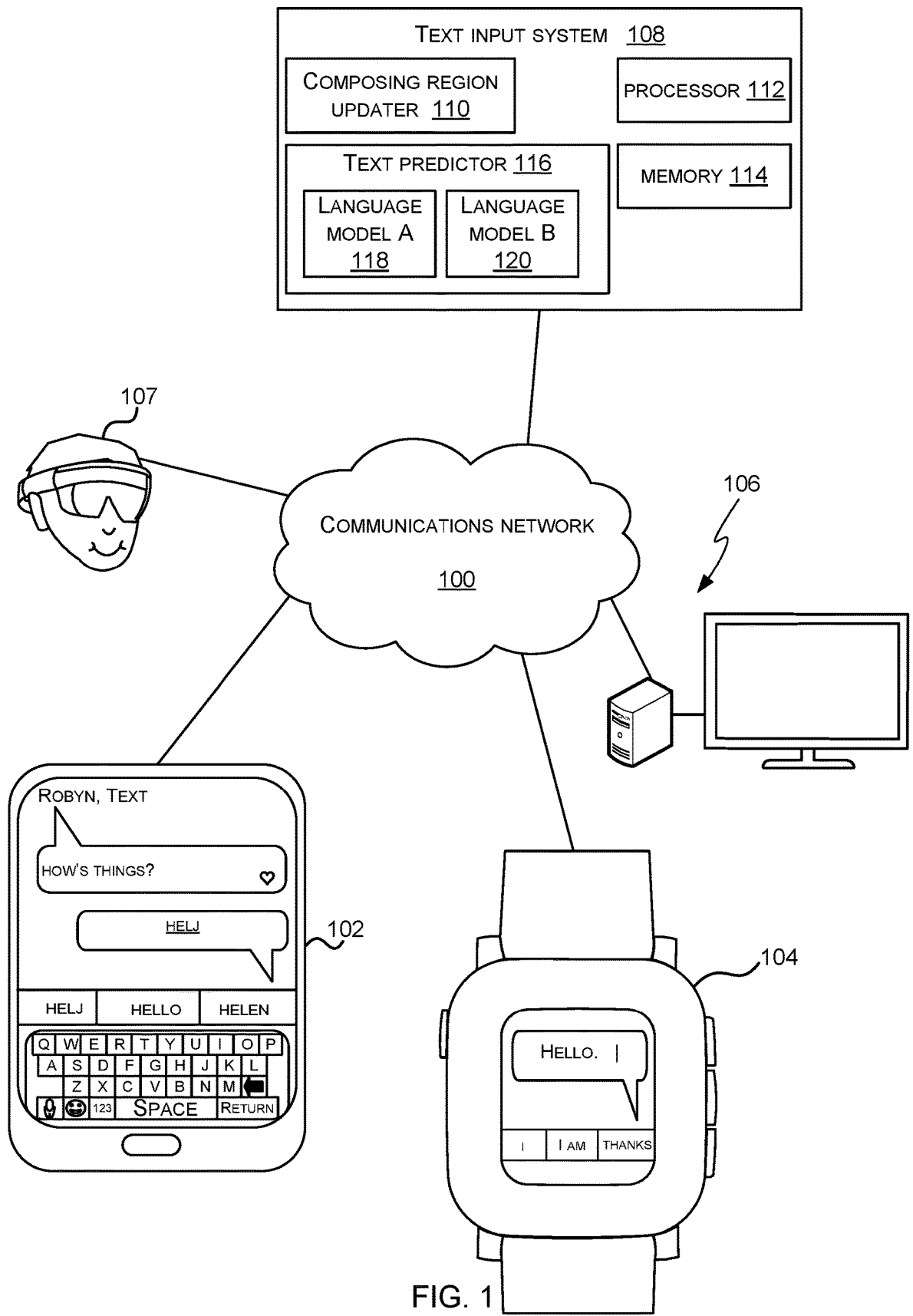
FIG. 1 is a schematic diagram of a text input system and various computing devices.

FIG. 1 is a schematic diagram of a smart phone 102 with a virtual keyboard, a smart watch 104 with a virtual keyboard and a desktop computing device 106. The augmented reality head-worn computing device 107 displays a virtual keyboard to the user and the user is able to select keys of the virtual keyboard using eye movements, finger pointing, speech commands or in other ways. The desktop computing device 106 has text authoring software which enables a user to input and edit text.

The smart phone 102, smart watch 104, desktop computing device 106 and augmented reality head worn-device 107 are examples of electronic devices where text input systems are used although other electronic devices may be used with the technology described herein. Each of the electronic devices 102, 104, 106, 107 either comprises a text input system 108 or has access to a text input system 108 via a communications network 100.

The text input system 108 comprises text predictor 116 technology such as one or more n-gram language models, neural network language models, or other language models. In some cases the text predictor 116 comprises a plurality of language models 118, 120. The text input system 108 comprises a composing region updater 110, at least one processor 112 and a memory 114 as described in more detail with reference to FIG. 8 below.

A composing region is a temporary store for text which has been selected by a user for entry to a computing device, but which has not yet been committed. Commitment in this context means computing text (called committed text) associated with at least some of the text in the composing region, and sending that text as output of the text input system. For example, the text is sent to a document authoring application, a messaging application, a web browser, or other application. In some examples, the contents of a composing region are displayed graphically on a display using underlining (or other graphical elements) to distinguish the contents of the composing region from other text on the display such as committed text. Other ways of presenting the contents of the composing region to a user are used in some cases, such as audio presentation or presentation using an augmented reality device. Other ways of distinguishing the contents of the composing region from other text presented to a user are used in some cases. Where autocomplete or autocorrection functionality is used the committed text is not the same as the text from the composing region from which the committed text was computed.

The functionality of the text input system 108 is described in more detail below and it may be shared between a computing device 102, 104, 106 and a text input system 108 in the cloud in some examples. The text input system 108 is implemented using one or more of: software, hardware, firmware.

Using the text input system 108 the user is able to more efficiently correct text which has been input to a computing device as a result of autocorrection or autocompletion of text using a text predictor. This is achieved by using a composing region updater 110 which more intelligently updates the composing region such that efficiencies in text input are gained.

In the example of FIG. 1 a user of the smart phone 102 composing a text message has selected "HELJ" and these letters are displayed as underlined since they are the current contents of the composing region. The text input system 108 has computed predicted next text items and selected three of these predictions which are "HELJ", "HELLO" and "HELEN". The text input system has computed the highest probability for "HELLO" being the next text item the user intends to input and so this text item is placed in the center of three candidate buttons which are part of a virtual keyboard of the smart phone 102.

In the example of FIG. 1 the user of the smart phone 102 also has a smart watch 104 which is being used to compose the same text message. The user added a space after "HELJ" and the composing region updater 110 interpreted the space as indicating the end of a word. It then autocompleted "HELJ" to become the candidate with the highest probability, which in this case is "HELLO". The user has added a full stop and the text input system 108 has autocompleted a space after the full stop. The text input system 108 has computed predictions for a next text item and displays these candidates "I", "I AM" and "THANKS" to the user for selection. In some situations the user intended to input "HELJ" to the message being composed. However, once the situation illustrated on the smart watch 104 has been reached it is difficult to return back to the situation of FIG. 1 102.

Alternatively, or in addition, the functionality of the text input system 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
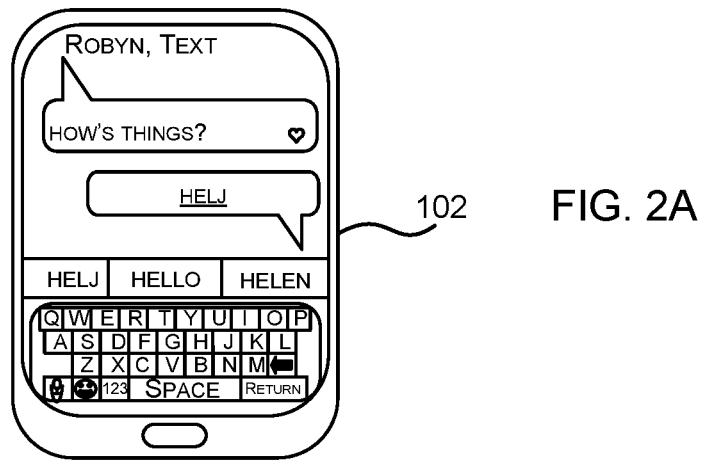
FIGS. 2A to 2C show a smart phone with a soft predictive keyboard being used to input text to the smart phone, and where auto completion occurs which is not as the user intended.
Figure 2B:
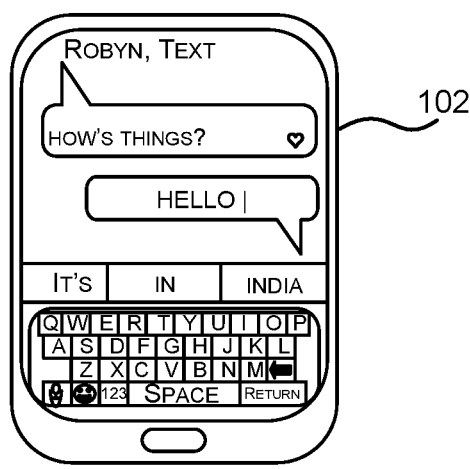
Figure 2C:
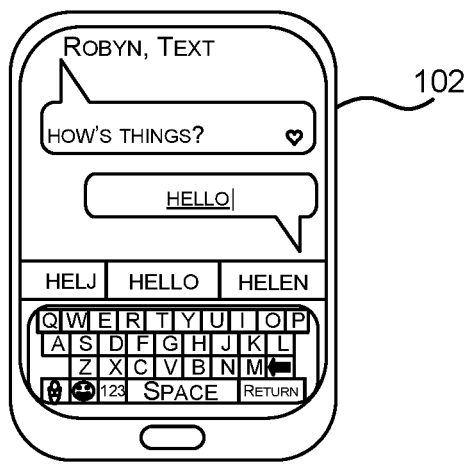

FIGS. 2A to 2C show a smart phone 102 such as that of FIG. 1 which has a predictive keyboard being used to input text. These figures illustrate how text in a composing region is used to predict candidates and is removed from the composing region during commitment such as during an autocomplete operation. The figures also illustrate how a user is able to return text to the composing region by taking corrective action such as by using a backspace button. All or part of the text in the composing region is committed when associated text is input to the computing device and the relevant text from the composing region is removed from the composing region.

A corrective action is any operation acting to edit or delete text which has been selected for input into the computing device, or which has already been input to the computing device. A non-exhaustive list of examples of corrective action is: selection of a backspace key which is either a physical key or is a key displayed on a touch screen, a voice command acting to edit or delete a text item, a gesture acting to edit or delete a text item, use of an eraser tip of a stylus.

The user intends to input "Helj it's time to go" where "Helj" is a person's name. The user manually enters "Helj" as indicated in FIG. 2A by using the keyboard to manually enter the letters one by one. The display on the smart phone 102 shows the letters "Helj" underlined as these are in the composing region. The predictive keyboard has computed predicted next words which are predicted to be the word the user is trying to enter. Three of the predictions are offered as candidates for input to the smart phone 102 at candidate buttons. In the example of FIG. 2A the candidates which are offered are "HELJ", "HELLO", and "HELEN". The candidate in the central button is the one which has the highest probability as computed by the predictive keyboard.

The user proceeds to manually enter a space as indicated in FIG. 2B and this causes the predictive keyboard to autocorrect "HELJ" with the most probable candidate which is "HELLO" and to insert a space. When the autocorrection is made, the text in the composing region which is autocorrected to "HELLO" is removed from the composing region as illustrated in FIG. 2B. The predictive keyboard computes candidate next words and these are "IT'S", "IN" and "INDIA".

The user is now becoming frustrated since the text being entered is not the intended text which is "Helj it's time to go". The user manually operates a backspace button (on the soft keyboard) and this acts to delete the space between and move the cursor to the end of "hello" so that "hello" is returned to the composing region as illustrated in FIG. 2C. The candidates are recomputed using the contents of the composing region and offered as in the situation of FIG. 2A.

Figure 2D:
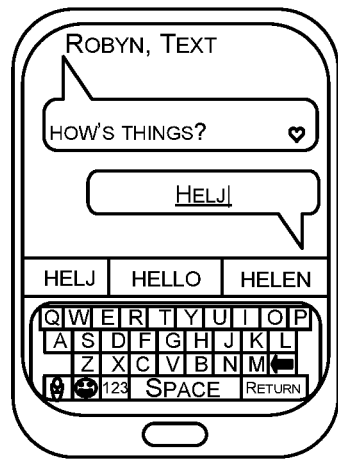
FIGS. 2D to 2E show the smart phone of FIGS. 2A to 2D being used to input text including a punctuation mark.
Figure 2E:
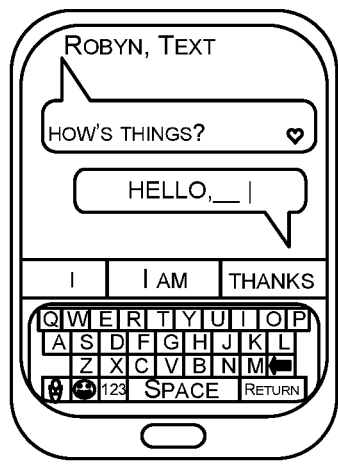

FIGS. 2D to 2E show a smart phone 102 such as that of FIG. 1 which has a predictive keyboard being used to input text. These figures illustrate how selection of punctuation marks leads to problems when it triggers autocorrection inappropriately. The user intends to input "Helj, it's time to go" as before. The user selects keys on the virtual keyboard so that the composing region comprises "Helj" as shown in FIG. 2D. Candidate words are computed and offered by the predictive keyboard and are the same as for the situation of FIG. 2A.

The user enters a comma by selecting a comma key on the virtual keyboard. The comma is treated as a new word by the text input system and triggers autocorrection of the contents of the composing region up to the start of the new word (i.e. the comma). Thus "Helj" is removed from the composing region and "Hello" is autocompleted and entered into the computing device. The comma is retained and a space is autocompleted after the comma. Candidate next words are computed and offered as indicated in FIG. 2E. The user is now significantly away from the intended text which was "Helj, it's time to go".

Figure 3A:
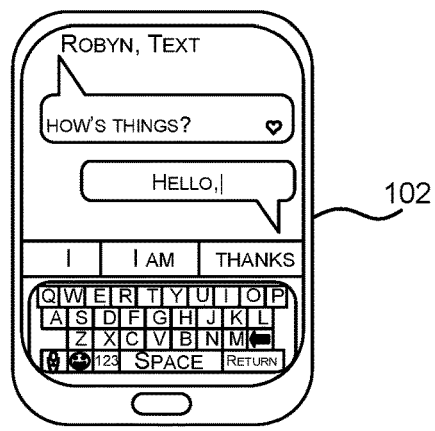
FIGS. 3A to 3D show the smart phone of FIGS. 2A to 2D being used to correct autocompleted text.

The user now takes action to correct the text as illustrated in FIGS. 3A to 3D. The user manually operates the backspace to delete the space and move the cursor adjacent to the comma as illustrated in FIG. 3A.

Figure 3B:
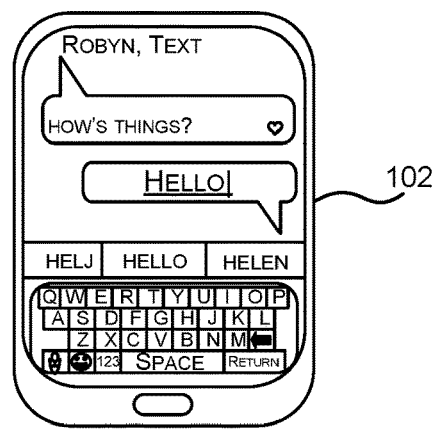
Figure 3C:
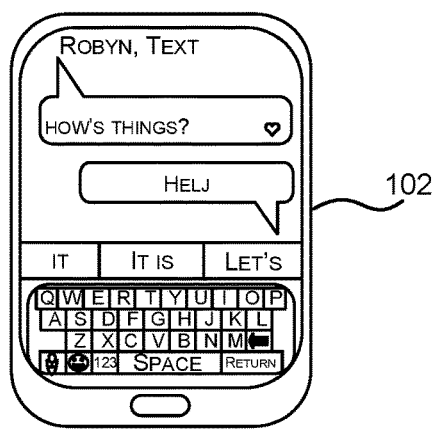

The user operates the backspace again to delete the comma and this brings "hello" into the composing region as illustrated in FIG. 3B. The candidates are recomputed and offered and are "helj", "hello", "Helen". The user taps on the candidate "Helj" which inserts the candidate, resets the composing region and insets a space and the candidates are recomputed and offered as illustrated in FIG. 3C.

Figure 3D:
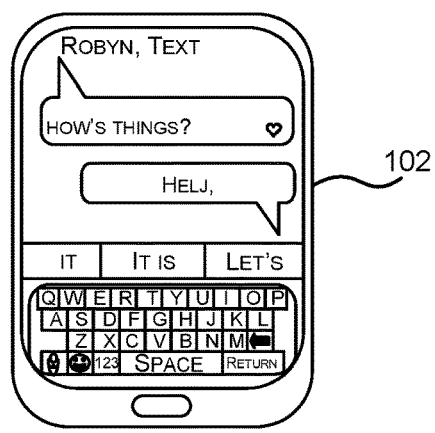

The user manually selects a key to input a comma as indicated in FIG. 3D and so the user is now on the way to inputting the intended text. However, it has been burdensome to do this from the point of view of the user since two backspace operations, a candidate selection and a selection of a full stop have been done. The resources of the smart phone 102 have also been used to implement the backspace operations, the computation and presentation of candidates and the detection of input associated with the comma.

The present technology enables a more efficient way of inputting text which gives reduced burden on the user and/or reduced burden on resources of the computing device.

Figure 4A:
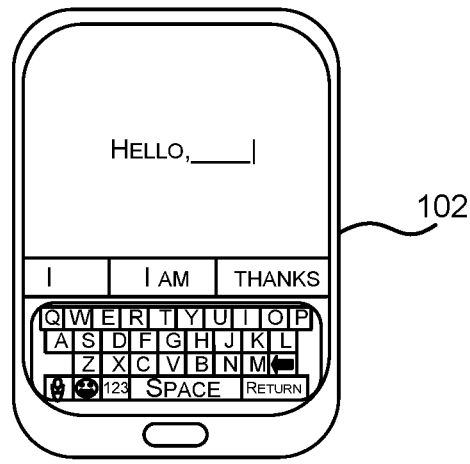
FIGS. 4A to 4C show a smart phone implementing the technology described herein to facilitate correction of autocompleted text in the case that a punctuation mark is used.
Figure 4B:
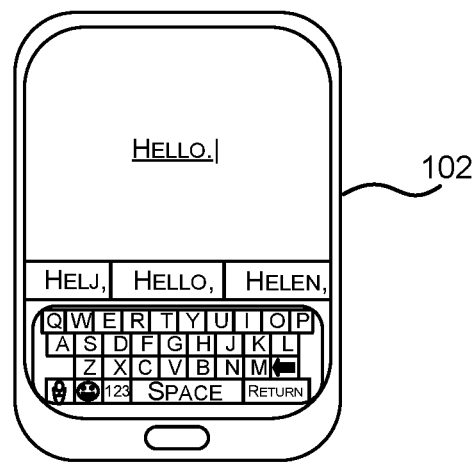
Figure 4C:
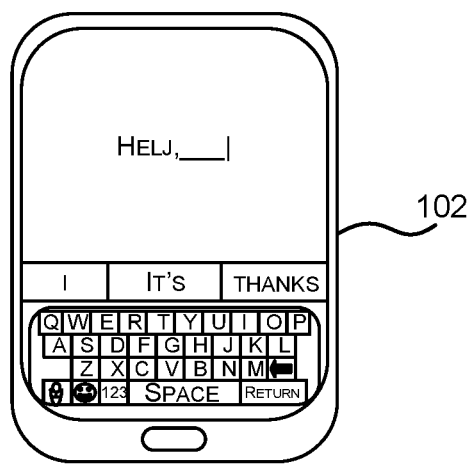

FIGS. 4A to 4C show a smart phone 102 such as that of FIG. 1 where the present technology is used as part of the text input system 108. Suppose that the situation of FIGS. 2D to 2E has just occurred, the user is now faced with the display as indicated in FIG. 2E which is repeated in FIG. 4A for ease of reference. The user operates backspace once to delete the space. This returns "Hello," to the composing region and results in the following candidates being computed and offered "Helj,", "Hello,", "Helen," As illustrated in FIG. 4B. The user is then able to select the candidate "Helj," which results in the situation of FIG. 4C where Helj, has been input and a space has been autocompleted. Candidate next words have been computed and offered and these are "I", "it's" and "thanks".

Figure 5A:
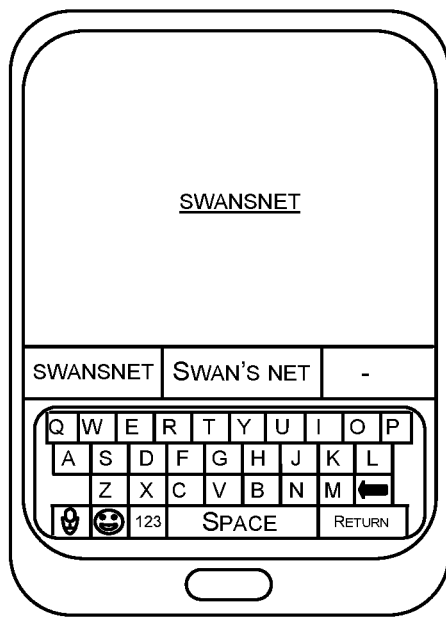
FIGS. 5A to 5B show a smart phone being used to input an address of a web site.
Figure 5B:
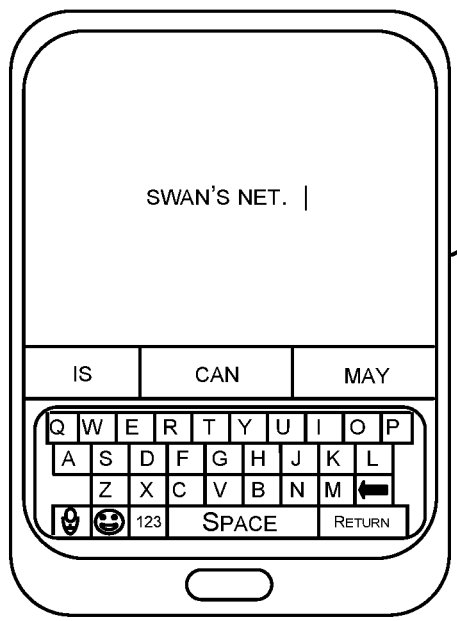

Without the present technology there can be many difficult text input situations such as that illustrated in FIGS. 5A to 5B. Suppose a user is intending to input text comprising the name of a web site such as "swansnet.com". As shown in FIG. 5A the user manually selects the keys for "swansnet" which gives a composing region containing "swansnet" underlined as in FIG. 5A. Candidate text items which the predictive keyboard predicts the user is trying to input are computed and offered and these are "swansnet", "swan's net", and one other text item indicated as "-" in FIG. 5A. The user proceeds to select a key for a full stop and this is interpreted as a new word. The predictive keyboard therefore autocorrects "swansnet" to "swan's net" and inserts a space after the full stop as indicated in FIG. 5B. The predictive keyboard computes candidate next text items and offers these as indicated in FIG. 5B by "is", "can" and "may". At this point the input text is significantly far away from the text it was intended to input "swansnet.com".

Figure 6:
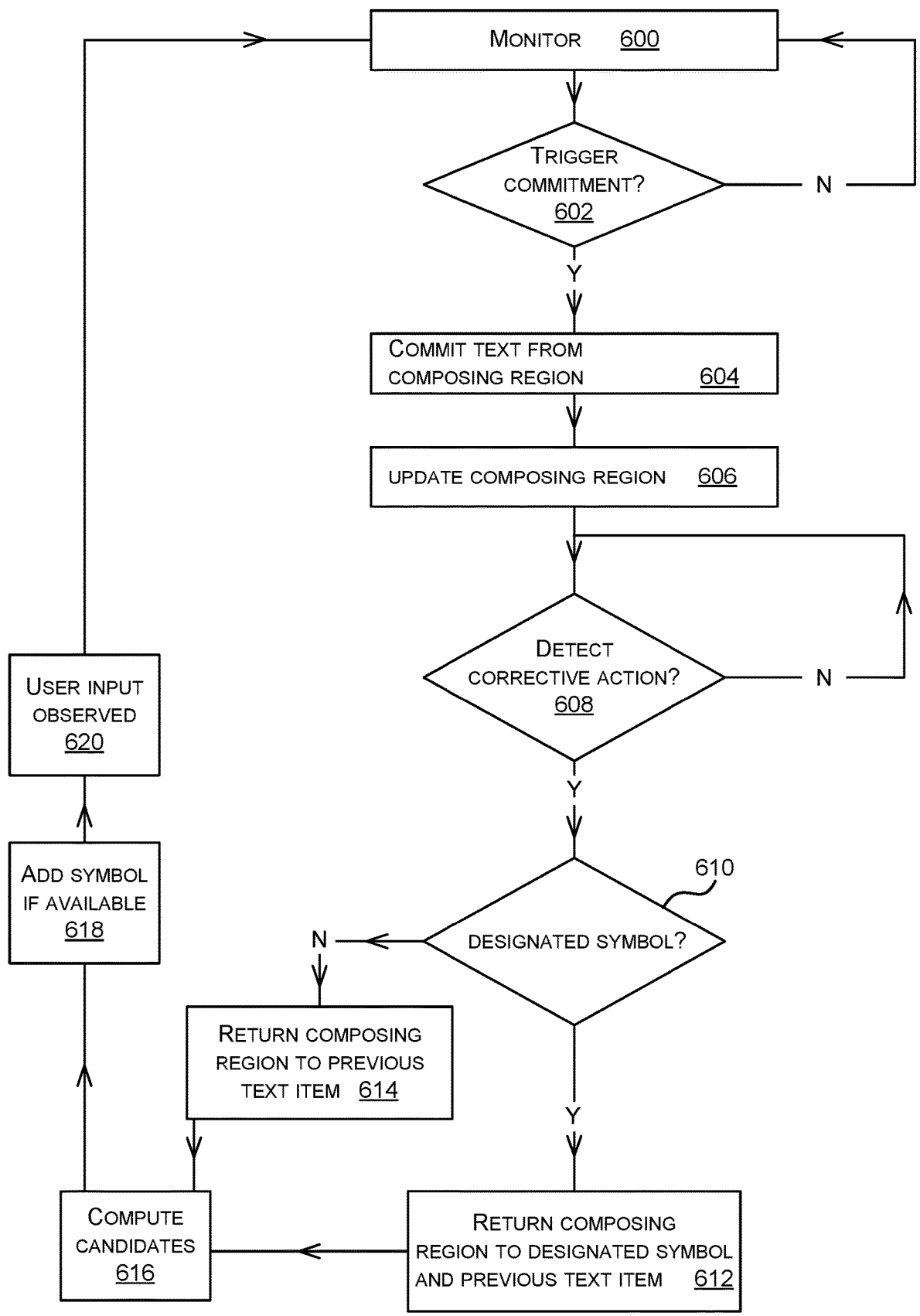
FIG. 6 is a flow diagram of a method of operation at the composing region updater of FIG. 1.

FIG. 6 is a flow diagram of a method of operation at the composing region updater 110 of FIG. 1.

The composing region updater monitors 600 text in the composing region which changes as user input is observed causing editing of text in the composing region. In certain situations commitment is triggered and the composing region updater checks 602 if commitment is triggered by checking pre specified criteria such as syntactic rules. In an example, commitment is triggered when the composing region updater receives information indicating the user has selected a candidate button. In another example, commitment is triggered when the composing region updater receives one or more specified text characters or combinations of text characters as input, such as a space, a full stop or a question mark, or a space followed by a question mark.

If commitment is not triggered the composing region updater 110 continues to monitor 600. If commitment 604 is triggered the composing region updater 110 computes text associated with at least some of the text in the composing region. For example, it selects the text from a candidate button selected by the user, or it selects the most probable candidate to use for autocompletion in the case that a user entered a space. The associated text is output from the text input system 108 and the composing region is updated 606 by removing text which gave rise to the committed text.

The composing region updater 110 checks whether corrective action is detected 608. For example, the composing region updater monitors for use of a backspace function or for a voice command indicating a corrective action. If corrective action is detected the composing region updater checks 610 for the presence of a designated symbol immediately before the input position indicator (such as the cursor). The designated symbol is any symbol which is likely to have given rise to a commitment through autocompletion or autocorrection. A non-exhaustive list of example designated symbols is: full stop, comma, question mark, exclamation mark, closing parenthesis, closing square bracket, closing curly bracket, closing speech mark.

In some examples the designated symbols differ according to which of a plurality of language models is used by the text predictor 116. For example, if an Arabic script language model is used by the text predictor 116 the designated symbols include an Arabic script equivalent of a full stop. For example, if a French language model is used by the text predictor 116 the designated symbols include a question mark preceded by a space, and an exclamation mark preceded by a space.

If no designated symbol is detected, such as no designated symbol immediately adjacent to the cursor in the composing region, the composing region is updated 614. The composing region is updated so that it includes the previously committed text. This is illustrated in the example of FIG. 2D where "hello" is the text which has previously been committed and this text is returned to the composing region as a result of the corrective action comprising the use of the backspace function.

If a designated symbol is detected, the composing region is updated 612 to include both the designated symbol and the previously committed text. This is illustrated in FIG. 4B where a full stop is detected immediately adjacent to the cursor and the composing region is updated to include the full stop and the previously committed text, which is "hello".

In some examples, the check at operation 610 is for a designated symbol which is immediately adjacent to a cursor (or other current input position indicator).

Once the composing region has been updated either at operation 614 or at operation 612 candidates are computed by the text predictor 116 on the basis of the contents of the composing region. If a designated symbol was detected at operation 610 it is added 618 to one or more of the computed candidates to compute composite candidates. The manner of adding the designated symbol to the computed candidates depends on the language model or language models used by the text predictor 116 as explained in more detail with reference to FIG. 7.

Further user input is observed 620 such as text selected and entering the composing region and the composing region updater monitors the contents of the composing region 600 and repeats the process of FIG. 6.

Figure 7:
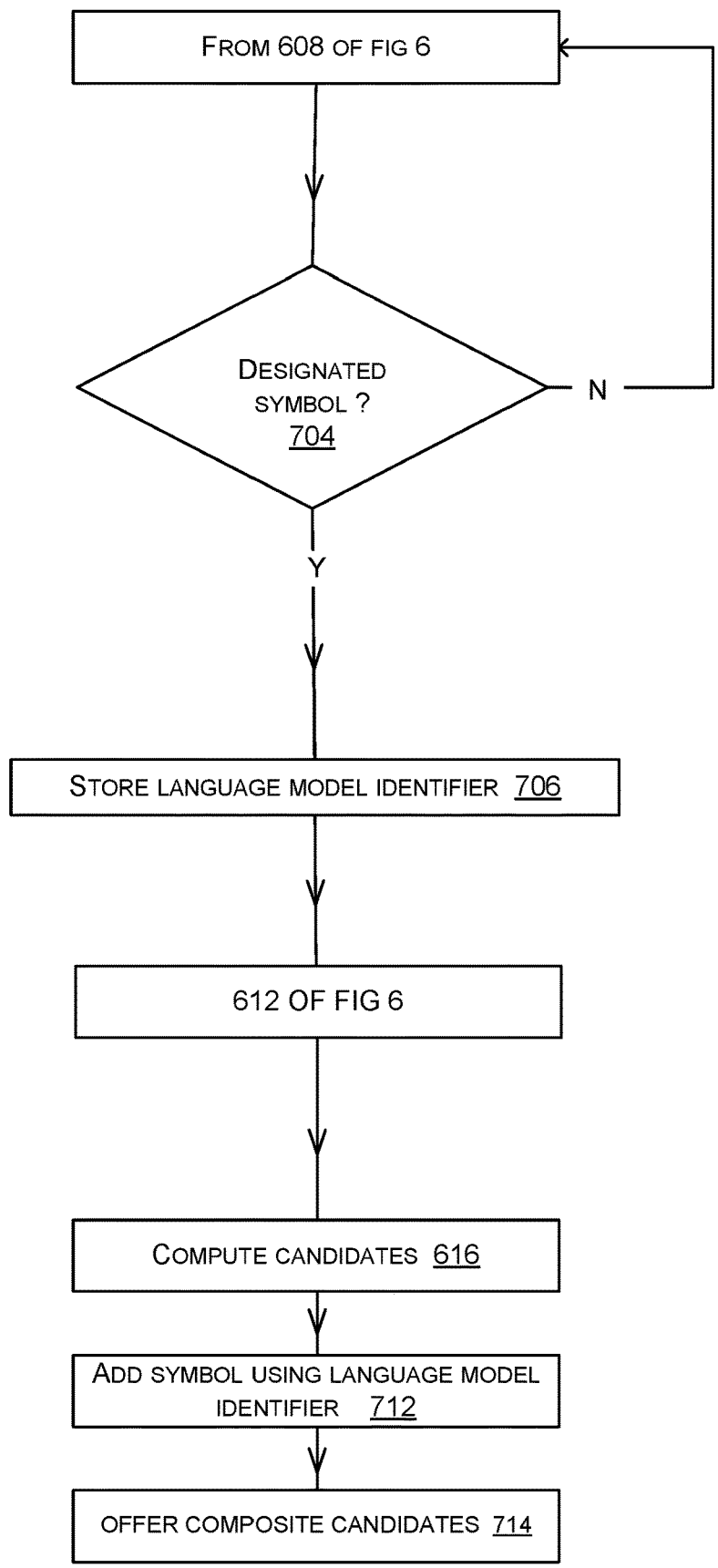
FIG. 7 is a flow diagram of another method of operation at the composing region updater of FIG. 1.

FIG. 7 is a flow diagram of part of the method of FIG. 6 in the case that multiple language models are used by the text predictor 116. At operation 608 of FIG. 6 (which is repeated in FIG. 7 for ease of reference) corrective action is detected. For example, a voice command indicating to delete text or a gesture indicating to backspace. The composing region updater checks 610 if a designated symbol is present in the composing region as described with reference to FIG. 6. If so, the composing region updater stores 706 an identifier of the language model.

The composing region updater carries out operation 612 of FIG. 6 and computes 616 candidates from the contents of the composing region using the text predictor. The composing region updater adds 712 the designated symbol which was detected at operation 610 to one or more of the computed candidates and offers 714 the composite candidates to the user for selection. This is done using the language model identifier stored at operation 706. For example, the manner in which the designated symbol is added to a candidate depends on the language model used.

For example, if an English language model is used by the text predictor the designated symbol is appended to one or more of the computed candidates. For example, if a French language model is used by the text predictor the designated symbol is appended to the computed candidates after appending a space. In an example the designated symbol is a question mark and this is appended to the candidates after an intervening space in the case a French language model is being used, and appended without an intervening space in the case an English language model is being used.

In examples where more than one language model is used by the text predictor 116 and these are associated with different ways of adding the designated symbol to the computed candidates, the language model identifier stored at operation 706 is used to decide which way of adding to use.

In other examples where more than one language model is used, one composite candidate is computed using one of the ways of adding and another composite candidate is computed using another of the ways of adding. In this way a user is offered the same root candidate as two or more options, according to different ways of using the designated symbol in different languages.

Figure 8:
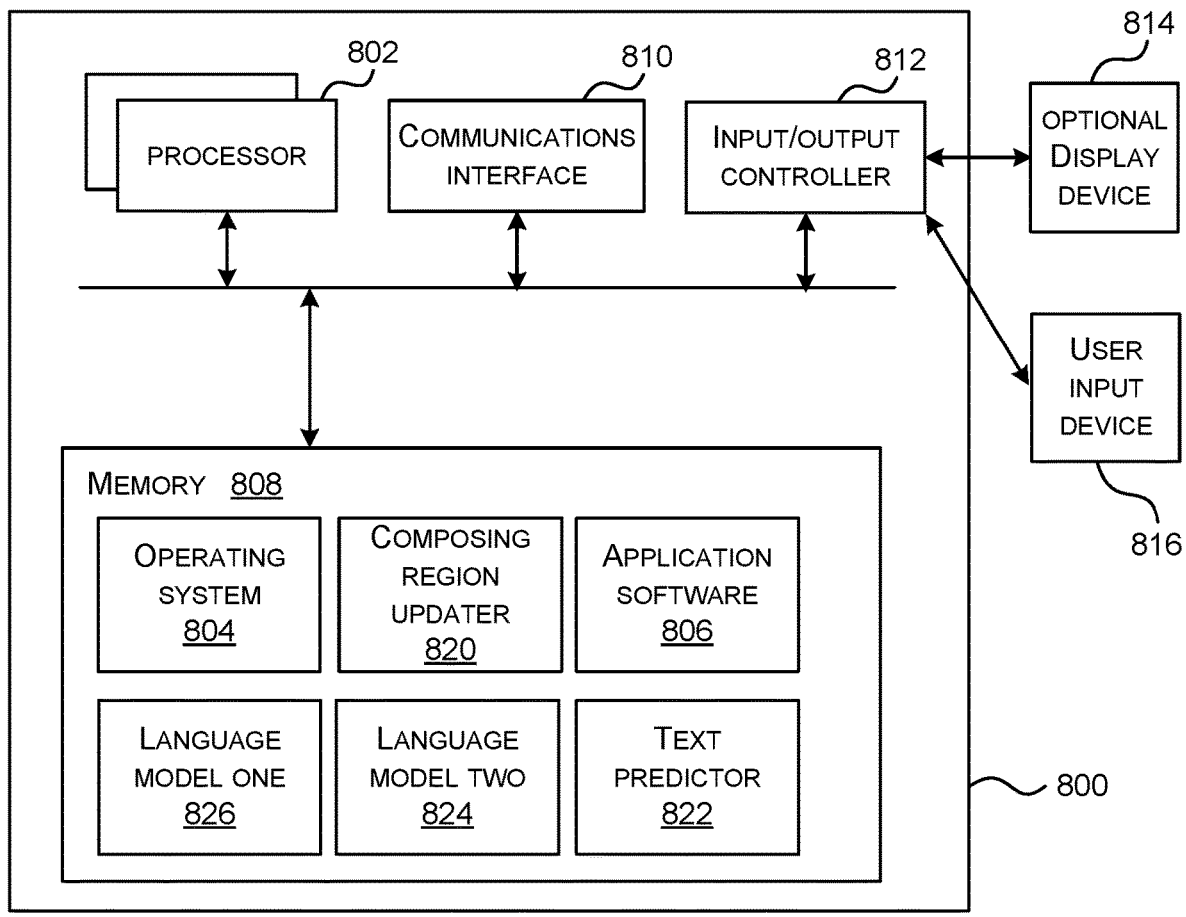
FIG. 8 illustrates an exemplary computing-based device in which embodiments of a text input system are implemented.

In some examples one or more of the language models 118, 120 is an n-gram language model. An n-gram language model is a predictor comprising a plurality of n-grams extracted from a corpus of training documents such as emails, text messages, web pages, books, or other documents. Individual n-grams of the model have probabilities computed from frequencies of observation of the n-grams in the corpus of documents. In some cases the probabilities are smoothed so that they sum to one. An n-gram is a group of two or more text items observed as contiguous in the corpus of documents. For example a two-gram of words observed in the immediately previous sentence of this document is "text items". The text items may be words, morphemes, phonemes, or other text items including parts of spoken words. An n-gram language model is typically used as a predictor by taking context text items in a sequence of text items and identifying n-grams in the language model comprising the context text items and which are longer than the context text items. In this way predicted text items are found which are present in the identified n-grams and which are potential next text items in the sequence of text items. By way of example only, the n-gram language model 208 may be an English n-gram language model, a Spanish n-gram language model, a medical terminology n-gram FIG. 8 illustrates various components of an exemplary computing-based device 800 which are implemented as any form of a computing and/or electronic device, and in which embodiments of a text input system 108 are implemented in some examples.

Computing-based device 800 comprises one or more processors 802 which are microprocessors, controllers or any other suitable type of processors for processing computer executable instructions to control the operation of the device in order to find examples of use of text items and/or facilitate data entry to the computing-based device 800. In some examples, for example where a system on a chip architecture is used, the processors 802 include one or more fixed function blocks (also referred to as accelerators) which implement a part of the method of FIG. 6 and/or 7 in hardware (rather than software or firmware). Platform software comprising an operating system 804 or any other suitable platform software is provided at the computing-based device to enable application software 806 to be executed on the device. The application software may comprise a messaging application, a content authoring application, an information retrieval application, a document reader, a web browser, or others where data is to be either input by the user or understood by a user. The computing-based device 800 has a composing region updater 820 as described herein and a text predictor 822 as well as a language model 826 and optionally a second language model 824.

The computer executable instructions are provided using any computer-readable media that is accessible by computing based device 800. Computer-readable media includes, for example, computer storage media such as memory 808 and communications media. Computer storage media, such as memory 808, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810 which is a network card, transceiver or other communication interface).

The computing-based device 800 also comprises an input/output controller 812 arranged to output display information to a display device 814 which may be separate from or integral to the computing-based device 800. The display information provides examples of use in an overlay panel, pop up window or in other ways. In some cases the display information provides a virtual keyboard and optionally other graphical user interfaces. The input/output controller 812 is also arranged to receive and process input from one or more devices, such as a user input device 816 (e.g. a mouse, keyboard, camera, microphone or other sensor). In some examples the user input device 816 detects voice input, user gestures or other user actions and provides a natural user interface (NUI). This user input may be used to select text items for which meanings are sought, to type text into the virtual keyboard 822, to select predicted candidate data items for entry, to give speech commands which select text items for which examples of use are sought and for other purposes. In an embodiment the display device 814 also acts as the user input device 816 if it is a touch sensitive display device. The input/output controller 812 outputs data to devices other than the display device in some examples, e.g. a locally connected printing device.

Any of the input/output controller 812, display device 814 and the user input device 816 may comprise natural user interface (NUI) technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A text input system for inputting text to a computing device comprising:

a memory storing a composing region comprising a plurality of text items selected by a user for potential input into the computing device;

a composing region updater which detects one of the plurality of text items as being a designated symbol;

the composing region updater configured to detect a corrective action acting to correct associated text associated with the selected text items and, when the corrective action is detected, to update the composing region to include the associated text and the designated symbol.

The text input system described above wherein the composing region updater is configured to detect the designated symbol by detecting a symbol which triggers removal of the selected text items from the composing region and input of the associated text into the computing device.

The text input system described above wherein the composing region updater is configured to detect the designated symbol by detecting a symbol which triggers autocompletion of at least some of the text items in the composing region.

The text input system described above wherein the composing region update is configured to detect the designated symbol by detecting a symbol which triggers autocorrection of at least some of the text items in the composing region.

The text input system described above comprising a text predictor configured to compute predictions comprising candidate text items and where the composing region updater is configured to detect the designated symbol by detecting a symbol which triggers use of one of the candidate text items as the associated text.

The text input system described above wherein the composing region updater is configured to detect a designated symbol from a plurality of designated symbols associated with at least one language model used by the text predictor.

The text input system described above comprising a processor configured to add the designated symbol to the candidate text items and the offer the candidate text items with the added designated symbol to the user for input to the computing device.

The text input system described above wherein the processor is configured to add the designated symbol to the candidate text items in a manner related to a language model of the text input system.

The text input system described above wherein the processor is configured to add the designated symbol to the candidate text items in a manner related to each of a plurality of language models of the text input system.

A computer-implemented method for inputting text to a computing device, the method comprising:

storing a composing region comprising a plurality of text items selected by a user for potential input into the computing device;

detecting one of the plurality of text items as being a designated symbol;

detecting a corrective action acting to correct associated text associated with the text items selected by the user and, when the corrective action is detected, updating the composing region to include the associated text and the designated symbol.

The method described above comprising detecting the designated symbol by detecting a symbol which triggers removal of the selected text items from the composing region and input of the associated text into the computing device.

The method described above comprising detecting the designated symbol by detecting a symbol which triggers autocompletion of at least some of the text items in the composing region.

The method described above comprising detecting the designated symbol by detecting a symbol which triggers autocorrection of at least some of the text items in the composing region.

The method described above comprising computing predictions comprising candidate text items and detecting the designated symbol by detecting a symbol which triggers use of one of the candidate text items as the associated text.

The method described above comprising detecting a designated symbol from a plurality of designated symbols associated with at least one language model used by the text predictor.

One or more device-readable media with device-executable instructions that, when executed by a computing system, direct the computing system to perform operations comprising:
  storing a composing region comprising a plurality of text items selected by a user for potential input into the computing device;
  detecting one of the plurality of text items as being a designated symbol by detecting a symbol which triggers removal of the selected text items from the composing region and input of the associated text into the computing device;
  detecting a corrective action acting to correct the associated text and, when the corrective action is detected, updating the composing region to include the associated text and the designated symbol.

The one or more device-readable media described above wherein the operations comprise computing predictions comprising candidate text items and detecting the designated symbol by detecting a symbol which triggers use of one of the candidate text items as the associated text.

The one or more device-readable media described above wherein the operations comprise detecting the designated symbol from a plurality of designated symbols associated with at least one language model used by the text predictor.

The one or more device-readable media described above wherein the operations comprise adding the designated symbol to the candidate text items and the offering the candidate text items with the added designated symbol to the user for input to the computing device.

The one or more device-readable media described above wherein the operations comprise adding the designated symbol to the candidate text items in a manner related to a language model of the text input system.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A text input system for inputting text to a computing device comprising:
a memory for storing receiving a plurality of text items input by a user for input into the computing device;
a processor configured to perform the following operations:
detect a designated symbol adjacent to one of the plurality of text items input by the user;
based on the detected designated symbol, trigger a commitment to the one of the plurality of text items adjacent to the detected designated symbol;
detect a backspace input by the user as a corrective action acting to correct associated text that is incorrect within the one of the plurality of text items input by the user; and
a text predictor implemented by the processor and configured to:
compute predictive text items that include the detected designated symbol;
based on the detected corrective action, automatically replace the associated text that is incorrect with a predictive text selected by the user from the predictive text items and append the detected designated symbol to the predictive text; and
in response to the corrective action taken, a composing region is updated to display the predictive text and the detected designated symbol.

2. The text input system of claim 1 wherein the predictive text is determined using a language model.

3. The text input system of claim 2 wherein the language model is an n-gram language model comprising a plurality of n-grams extracted from a corpus of training data.

4. The text input system of claim 1 wherein a composing region updater, implemented by the processor, is configured to detect the designated symbol by detecting a symbol which triggers autocorrection of at least some text items in the composing region.

5. The text input system of claim 1 wherein the text predictor is further configured to compute a prediction comprising predictive text items that include the designated symbol;
replace the one of the plurality of text items with the prediction while appending the designated symbol; and
wherein when the corrective action is taken, the composing region is updated by replacing the prediction with a correct text and the designated symbol.

6. The text input system of claim 5 wherein a composing region updater, implemented by the processor, is configured to detect a designated symbol from a plurality of designated symbols associated with at least one language model used by a text predictor.

7. The text input system of claim 1 wherein the detected designated symbol is one of the following: a full stop, a comma, a question mark, an exclamation mark, a colon, a semicolon, a period, an apostrophe, a quotation, a dash, a hyphen, an ellipsis, a parenthesis, a square bracket, a closing curly bracket, or a closing speech mark.

8. The text input system of claim 1 wherein the processor is configured to add the designated symbol to candidate text items in a manner related to a language model of the text input system.

9. The text input system of claim 1 wherein the processor is configured to add the designated symbol to candidate text items in a manner related to each of a plurality of language models of the text input system.

10. A computer-implemented method for inputting text to a computing device, the method comprising:
receiving a plurality of text items input by a user for input into the computing device;
detecting a designated symbol adjacent to one of the plurality of text items input by the user;
based on the detected designated symbol, triggering a commitment to the one of the plurality of text items adjacent to the detected designated symbol;
detecting a backspace input by the user as a corrective action acting to correct associated text that is incorrect within the one of the plurality of text items;
computing predictive text items that include the detected designated symbol;
based on the detected corrective action, automatically replacing the associated text that is incorrect with a predictive text selected by the user from the predictive text items and append the detected designated symbol to the predictive text; and
in response to the corrective action taken, updating a composing region to display the predictive text and the detected designated symbol.

11. The method of claim 10 further comprising detecting the designated symbol by detecting a symbol which triggers removal of one or more of the plurality of text items from the composing region and input of the associated text into the computing device.

12. The method of claim 10 further comprising detecting the designated symbol by detecting a symbol which triggers autocompletion of at least some text items in the composing region.

13. The method of claim 10 further comprising detecting the designated symbol by detecting a symbol which triggers autocorrection of at least some text items in the composing region.

14. The method of claim 10 further comprising computing predictions comprising candidate text items and detecting the designated symbol by detecting a symbol which triggers use of one of the candidate text items as the associated text.

15. The method of claim 10 further comprising detecting a designated symbol from a plurality of designated symbols associated with at least one language model used by a text predictor.

16. One or more computer storage media comprising computer-readable instructions that, when executed by a computing system, direct the computing system to perform operations comprising:
receiving a plurality of text items input by a user for input into a computing device;
detecting a designated symbol adjacent to one of the plurality of text items input by the user;
based on the detected designated symbol, triggering a commitment to the one of the plurality of text items adjacent to the detected designated symbol;
detecting a backspace input by the user as a corrective action acting to correct associated text that is incorrect within the one of the plurality of text items input by the user;
computing predictive text items that include the detected designated symbol;
based on the detected corrective action, automatically replacing the associated text that is incorrect with a predictive text selected by the user from the predictive text items and append the detected designated symbol of the predictive text; and in response to the corrective action taken, updating a composing region to display the predictive text and the detected designated symbol.

17. The one or more computer storage media of claim 16 wherein the operations comprise computing predictions comprising candidate text items and detecting the designated symbol by detecting a symbol which triggers use of one of the candidate text items as the associated text.

18. The one or more computer storage media of claim 17 wherein the operations comprise adding the designated symbol to the candidate text items and offering the candidate text items with the added designated symbol to the user for input to the computing device.

19. The one or more computer storage media of claim 16 wherein the operations comprise detecting the designated symbol from a plurality of designated symbols associated with at least one language model used by a text predictor.

20. The one or more computer storage media of claim 16 wherein the operations comprise adding the designated symbol to candidate text items in a manner related to a language model of the computing system.

* * * * *